July 11, 1961 H. ERDMANN 2,991,546
MEANS FOR ASSEMBLING OPEN RETAINING
RINGS ON SHAFTS, PINS AND THE LIKE
Filed Feb. 9, 1959 7 Sheets-Sheet 1

INVENTOR
HANS ERDMANN

BY *J. Harold Kilcoyne*
ATTORNEY

July 11, 1961 H. ERDMANN 2,991,546
MEANS FOR ASSEMBLING OPEN RETAINING
RINGS ON SHAFTS, PINS AND THE LIKE
Filed Feb. 9, 1959 7 Sheets-Sheet 2

INVENTOR
HANS ERDMANN

BY *J. Harold Kiesewe*

ATTORNEY

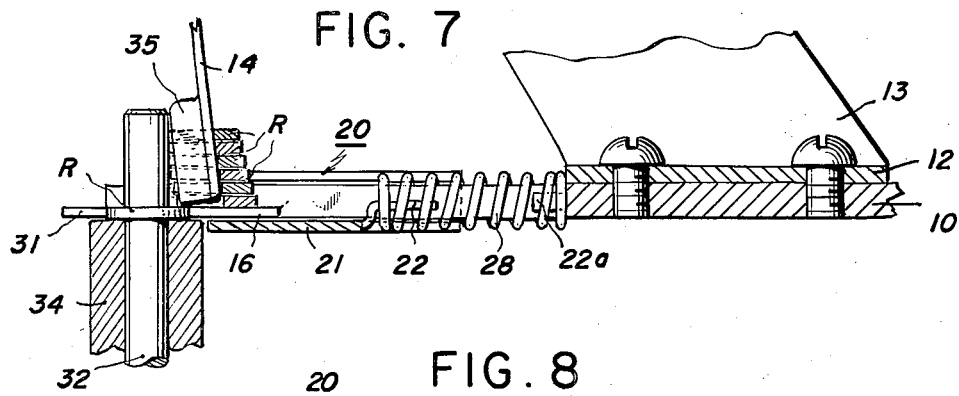
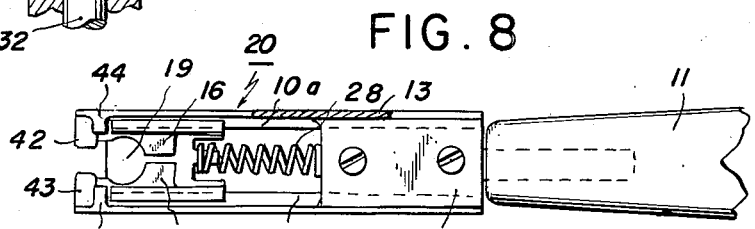
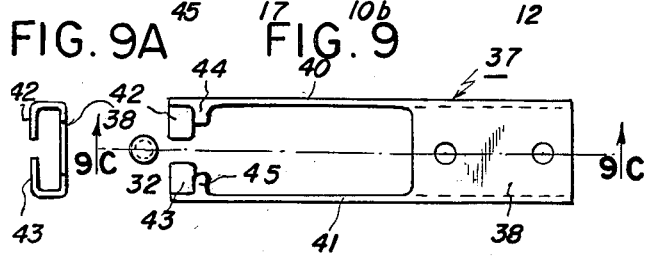
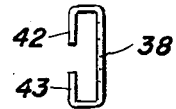
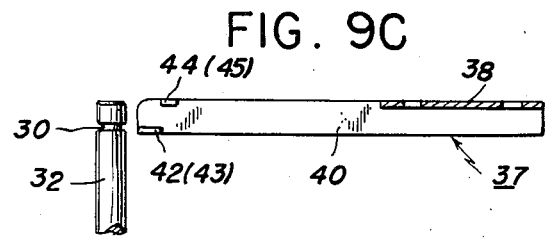
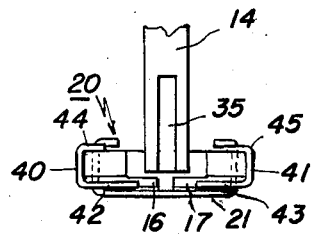
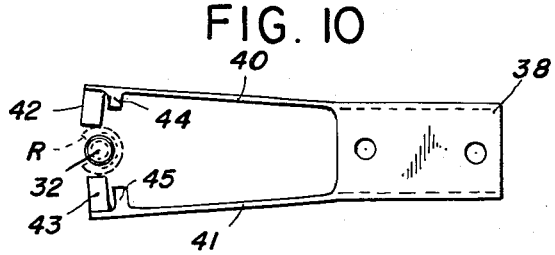

July 11, 1961

H. ERDMANN 2,991,546

MEANS FOR ASSEMBLING OPEN RETAINING
RINGS ON SHAFTS, PINS AND THE LIKE

Filed Feb. 9, 1959

INVENTOR
HANS ERDMANN

BY *J Harold Kilcoyne*

ATTORNEY

INVENTOR
HANS ERDMANN
BY *Harold Kilcoyne*
ATTORNEY

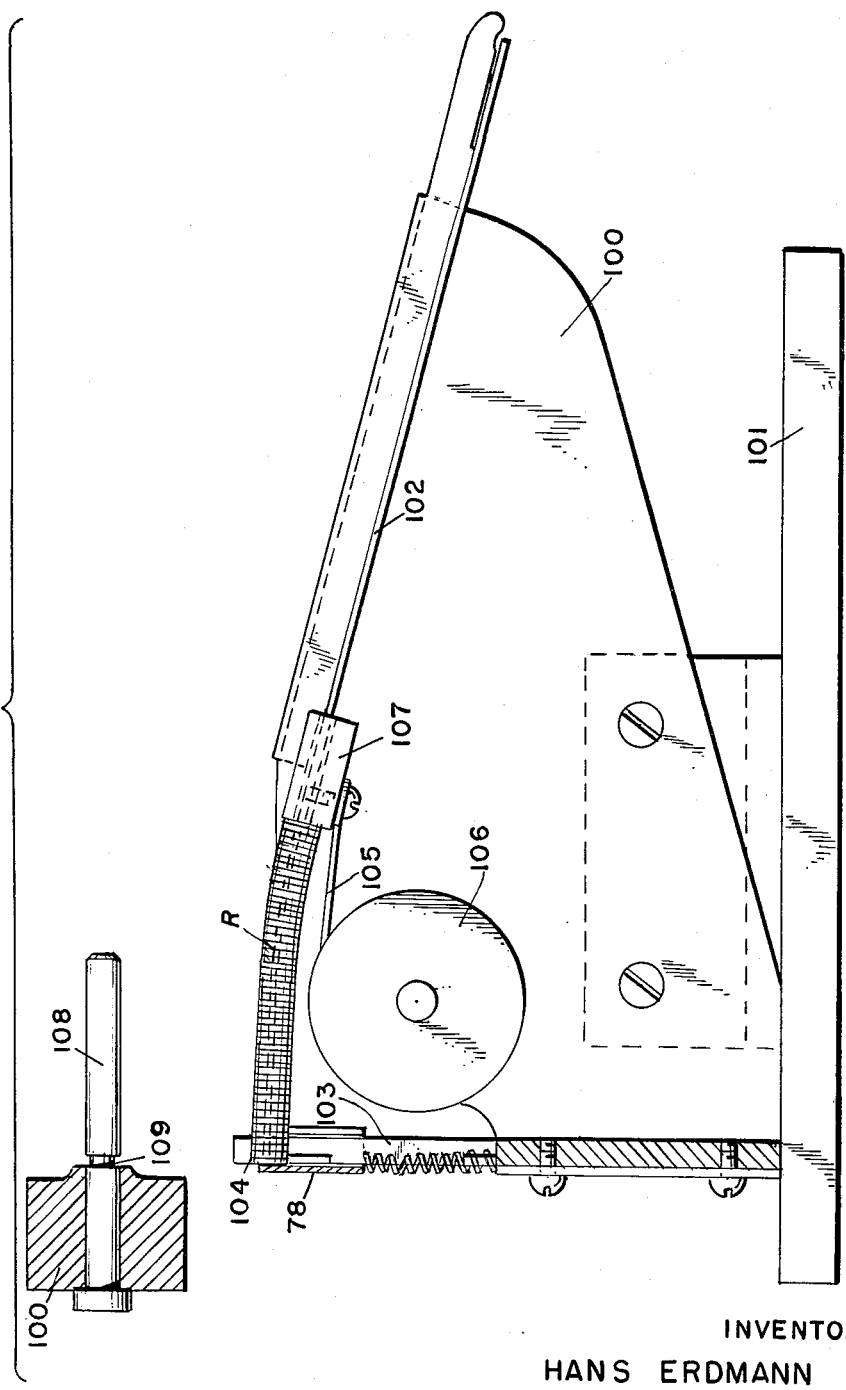

United States Patent Office 2,991,546
Patented July 11, 1961

2,991,546
MEANS FOR ASSEMBLING OPEN RETAINING RINGS ON SHAFTS, PINS AND THE LIKE
Hans Erdmann, Maplewood, N.J., assignor to Waldes Kohinoor, Inc., Long Island City, N.Y., a corporation of New York
Filed Feb. 9, 1959, Ser. No. 792,160
11 Claims. (Cl. 29—229)

This invention relates to improvements in means for assembling "open" retaining rings on shafts, pins and the like, and more particularly to an improved combination retaining ring dispensing and applying tool of the general type disclosed and claimed in my prior application Serial No. 485,785, filed February 2, 1955, the present application being a continuation-in-part of my allowed application Serial No. 508,264, filed May 13, 1955, now abandoned which adds to the subject-matter of the allowed application that of my application Serial No. 538,041, filed October 3, 1955 now abandoned.

Continuing experience with a so-called combination ring-dispensing and applying tool according to my prior application Serial No. 485,785 revealed that its use is practical only in cases (*a*) wherein it is possible to so position the shaft or pin on which ring assembly is to be effected in a supporting fixture or with respect to the machine part to be located by the assembled ring that there is provided a clearance space between the ring-receiving groove and the adjacent end face of the fixture or corresponding end face of the machine part which at least equals the axial thickness of the ring backing flange of the applicator member; and (*b*) wherein it is possible to position the tool so that its stack rod on which a plurality of the rings to be dispensed are mounted in stack or column formation is substantially vertically disposed and arranged above the applicator member. In explanation of these limitations, the applicator member of the prior ring dispensing and applying tool is provided with a ring backing flange which in effect forms a rigid ledge extending along its ring-receiving recess which serves to support the ring from below. Therefore, clearance between fixture end face and groove location which at least equals the thickness of said backing flange must be provided, because otherwise movement of the applicator member towards the shaft or pin would be obstructed by prior engagement of the backing flange with the fixture. Yet there are numerous cases wherein it is not desired or possible to provide such a clearance space between the fixture (or machine part) end face and groove location as is necessary to the accommodation of the ring backing flange as aforesaid, and for those cases my prior tool is not well suited.

As to the requirement that the tool be so held or positioned that its stack rod is arranged vertically above the applicator member, such stems from the fact that the prior tools depend on gravity feed of the rings from the stack rod to the cut-out or other provision of the applicator member in which the lowermost ring of the ring column mounted on said stack rod is received and held in the "assembly-ready" position for the next assembly operation. But here again, there are numerous ring applications which, because of the position that the shaft or pin is or must be held or positioned during the ring assembly operation, do not permit of the ring feeding by gravity to the applicator member, and there are other cases which, because of space limitation, for example, do not permit of or else make highly impractical the use of the ring assembly tool whose stack rod extends vertically above the usually horizontal working plane of the applicator member, as is a prerequisite to gravity feed of the rings.

Stated broadly, a principal object of the present invention is the provision of a combination retaining-ring dispensing and applying tool which overcomes the aforesaid limitations of my prior ring asembling tool in that it can be used in those numerous applications or cases wherein there is no clearance space provided between the fixture (or machine part) end face and ring groove just as effectively as in the applications wherein such clearance space is provided, and/or wherein the tool must be so held or positioned that gravity feed of the rings from the stack rod to applicator member-cut-out is not possible or practical.

A more particular object of the invention is the provision of a combination retaining-ring dispensing and applying tool characterized in that it is capable of applying a ring in a groove of a shaft or pin disposed immediately adjacent the end face of a fixture in which the pin or shaft is held.

Yet another object of the invention is the provision of a combination retaining-ring dispensing and applying tool employing an applicator member functioning in generally similar manner and as effectively as the applicator member according to my prior application Serial No. 485,785, but which substitutes for the rigid backing flange of the applicator member thereof a retractible slide member which is capable normally of supporting and backing a ring received in the cut-out or recess of the applicator member but which is readily retractible to an out-of-the-way position when it engages with the fixture or a machine part with which the shaft or pin intended to receive the supported retaining ring is associated, thereby enabling the tool to function effectively in the case of the ring-receiving groove in the shaft or pin being located immediately adjacent the upper end face of said fixture or machine part.

Another important object of the invention is the provision of a combination retaining-ring dispensing and applying tool which employs a novel guide means which is effective positively to prevent inaccurate alignment of ring to groove as the former is fed into its groove; that is to say, a guide means which insures exact horizontal and vertical alignment of ring with groove and thereby prevents the ring being transferred to the groove taking on an angular position or being canted with respect to the groove during the assembly operation.

Still another object of the invention is the provision of a combination retaining-ring dispensing and applying tool as aforesaid, characterized by the provision of guide means capable of exactly lining up the tool with the groove in the shaft or pin in which a ring is to be fed, thereby to insure against the danger of improper positioning of the ring with respect to groove as is likely to occur if the tool is presented to the shaft or pin solely by hand.

A further, more particular object of the invention is the provision of a combination ring dispensing and applying tool as last stated, wherein the guide means takes the form of spreadable arms having finger-like protrusions which are adapted to enter the groove in which a ring is to be assembled from diametrically opposite sides thereof, thereby to positively center the tool on the shaft or pin and to insure against misalignment of ring-groove with respect to tool during assembly of the ring in the groove.

Yet another important object of the invention is to provide a combination retaining ring dispensing and applying tool incorporating means for positively feeding the rings being assembled one by one from a stack or other supply thereof to the applicator cut-out or recess provided in the applicator-member component of the tool to receive and position the individual rings for assembly, as enables the rings to be fed in any desired or convenient direction best suited to the work or space available for the assembly operation and hence greatly increases the range and flexibility of the present tool as compared to the prior tools.

Still another object of the invention is the provision of a combination retaining ring dispensing and applying tool which is so constructed and arranged as to mount a supply of rings to be assembled in stack formation generally as in the prior tools serving similar function, but which is further characterized by the stack being included within the vertical dimension of the tool proper, as distinguished from extending vertically above the same, and by the stack being disposed at any angle to the vertical best suited to the work and space available for assembly.

A more specific object of the invention is the provision of a combination retaining-ring dispensing and applying tool of the general type disclosed in my aforesaid application Serial No. 485,785, but characterized by the applicator member thereof mounting a retractible slide which, in addition to yielding the above-explained advantages, also by closing off one side face of its ring-receiving cut-out, normally serves as an end support for the column of the rings to be assembled arranged on the stack rod of the device; and by incorporation of means for biasing the ring column towards the slide acting as an end support as aforesaid, thereby insuring positive feed of the rings to the cut-out upon the cut-out being free to receive the same following each ring-assembly operation, regardless of the angular position of the applicator member and its associated stack rod.

The above and other objects and features of advantage of an improved retaining ring dispensing and applying means according to the present invention will appear from the following detailed description thereof, taken with the accompanying drawings illustrating various physical forms which the improved tool may take, wherein:

FIGS. 6 and 7 are broken-away longitudinal sectional views corresponding to FIGS. 3 and 5 but on an enlarged scale;

FIG. 8 is a broken-away top plan view similar to FIG. 2 but illustrating a modified form of tool according to the invention;

Figure 16:
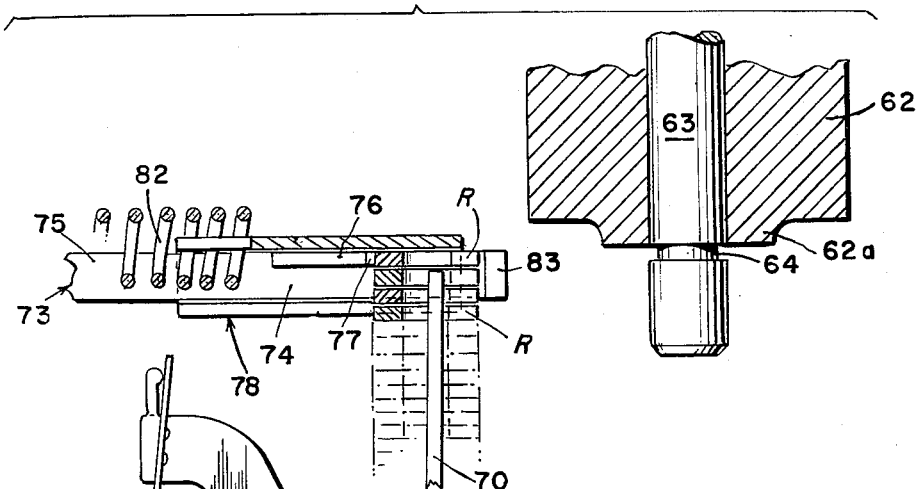
Figure 12:
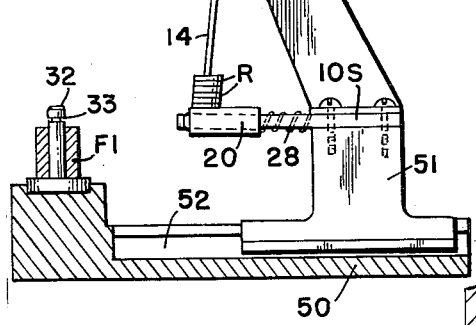
Figure 17:
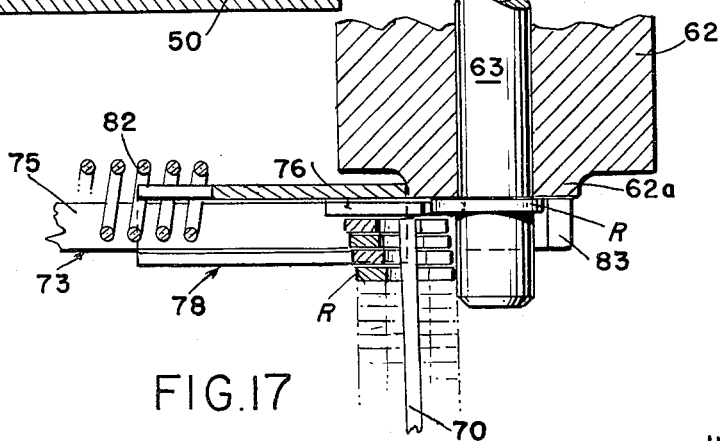
Figure 13:
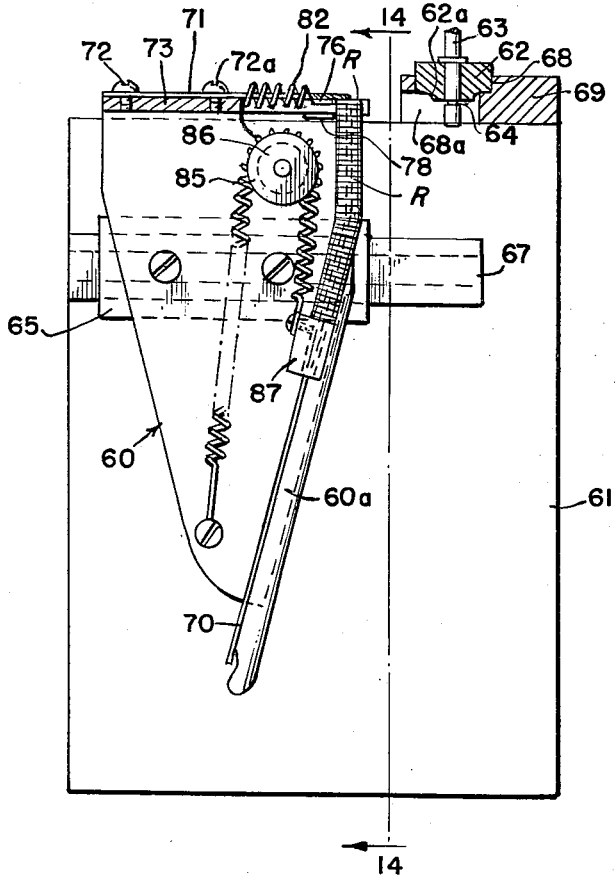
Figure 14:
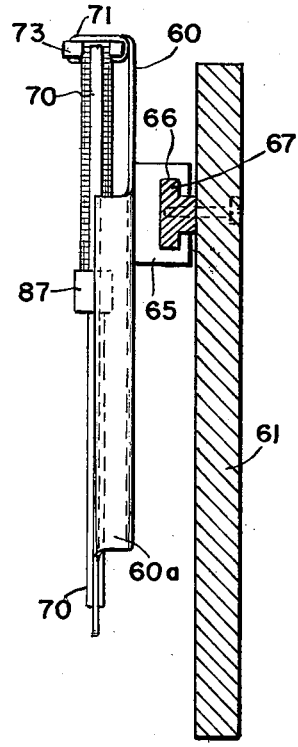
Figure 15:
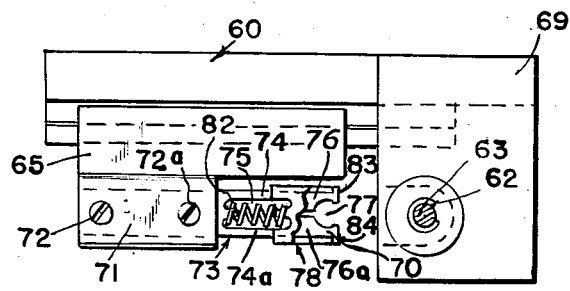
Figure 18:
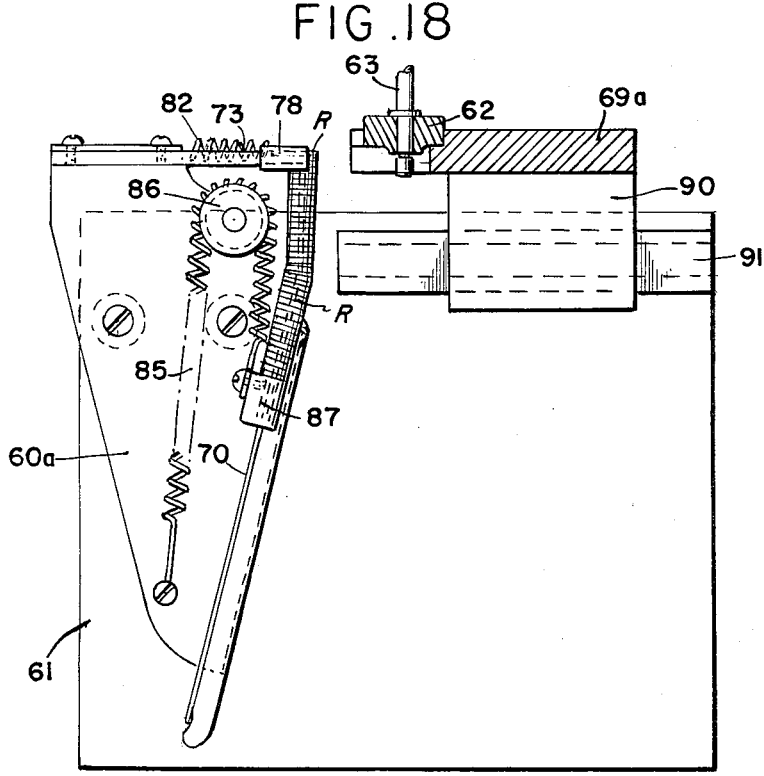
Figure 19:
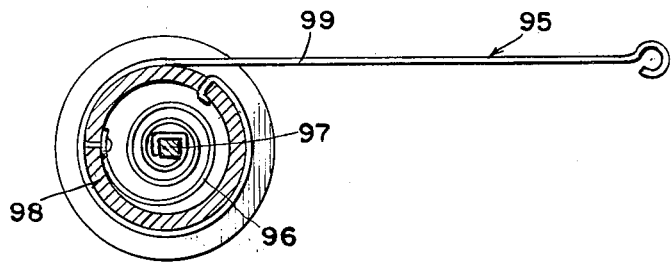

FIGS. 9–9C, inclusive, are top plan, front and rear end and longitudinal sectional views, respectively, of the tool guiding means employed in the FIG. 8 form of tool;

FIG. 10 is a view corresponding to FIG. 9 but illustrating the manner in which the arms of the tool guiding means may flex so as to enable them to clear a just-assembled ring in the backing-off of the tool from the pin to which the ring has been assembled;

FIG. 11 is a front end view of the tool and its guiding means as shown in FIG. 8;

FIG. 12 is a part-sectional side elevation of a variant form of tool operating on the principle of the FIGS. 1–7 tool, for example, but being of the support-mounted rather than of the hand-carried type;

FIG. 13 is a front elevation, partly in section, of another embodiment of a combination retaining ring dispensing and applying tool of the invention made possible by the positive ring-feed feature of the invention;

FIG. 14 is a section along line 14—14 of FIG. 13;

FIG. 15 is a broken-away top plan view of the tool illustrated in FIG. 13;

FIGS. 16 and 17 are enlarged, partly diagrammatic views which, respectively, illustrate the tool incorporating the positive ring-feed feature moving towards the shaft- or pin-carrying fixture preparatory to a ring-assembly operation, and the tool still in engagement with the fixture immediately upon the ring assembly operating having been effected;

FIG. 18 is a view similar to FIG. 13 illustrating a somewhat modified arrangement of parts;

FIG. 19 is a part-sectional view illustrating a modified form of spring means for imparting positive feed movement to the rings according to the invention than is shown in FIGS. 13 and 18, for example; and FIG. 20 is a side elevation of another form of retaining ring dispensing and applying tool of the invention, made possible by the herein proposed positive ring-feed means.

Referring to FIGS. 1–7A, which illustrate a hand-carried form of ring dispensing and applying tool of the invention, reference numeral 10 generally indicates the blade member of an applicator whose rearward end is provided with a handle 11. Affixed to the solid rear part of the blade member, i.e. just forwardly of the handle, is the base or foot flange 12 of an upstanding, forwardly inclined bracket 13 serving to support, from a point above the applicator blade member 10, the lower part of a stack rod 14, preferably having the form of a spring rail as disclosed and claimed in my aforesaid application Serial No. 485,785.

Figure 1:
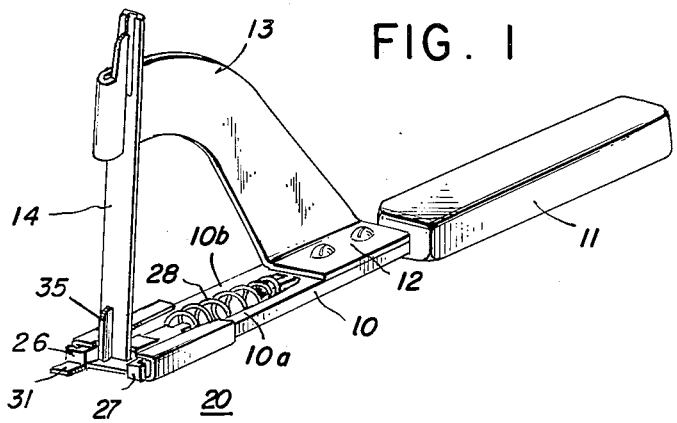
FIG. 1 is a perspective view of one form of improved ring dispensing and applying tool as herein proposed.
Figure 2:
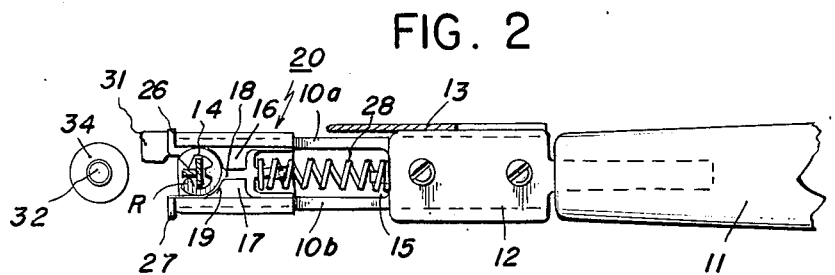
FIGS. 2 and 3 are broken-away top plane and longitudinal sectional views, respectively, showing the tool according to the FIG. 1 form in readiness to apply a ring to a shaft or pin, shown to consist of a pin supported in a fixture.
Figure 3:
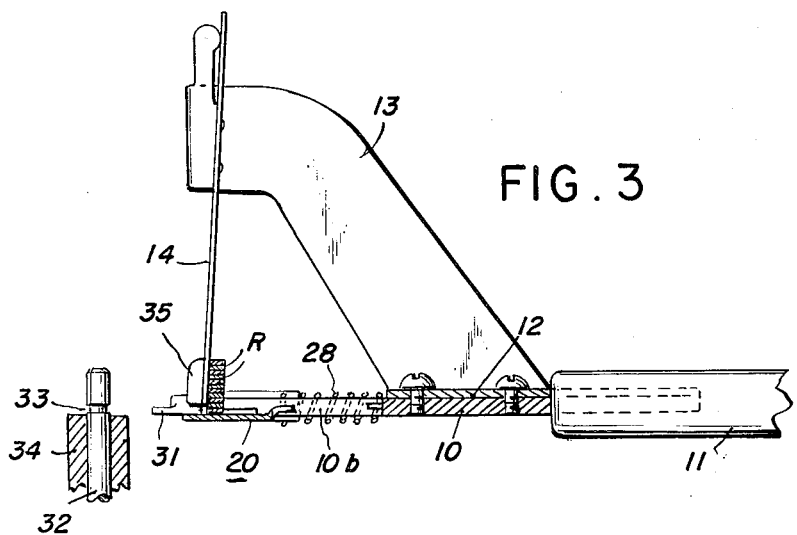
Figure 4:
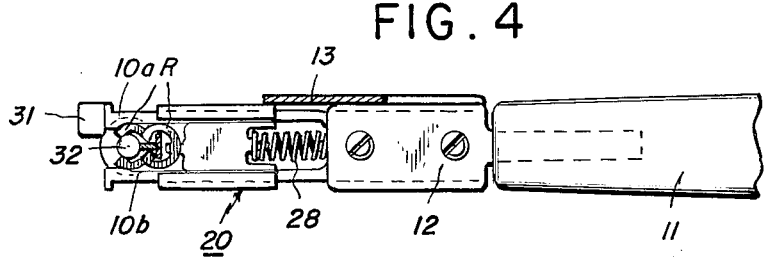
FIGS. 4 and 5 are views corresponding to FIGS. 2 and 3, respectively, but showing the tool immediately following completion of a ring applying operation and before backing-off of the tool from the pin.

The aforesaid applicator blade 10 is illustrative of the type whose front or working end portion comprises two springy side arms 10a, 10b which are integral with its aforesaid solid rear portion and are laterally spaced from one another so as to provide a generally rectangular opening 15 (FIG. 2). Extending inwardly from the forward ends of said side arms are complemental jaw members 16, 17 which are spaced by a slot 18, whereby they may spread and contract with respect to one another. The forward edges of said jaw members extend along arcs which together define a substantially semi-circular, forwardly opening cut-out 19 of a size as to be capable of receiving with slight clearance one of the retaining rings R to be dispensed and applied, lowering into said cut-out from above. By reference to FIGS. 6 and 7, it will be seen that the jaw members 16, 17 extend inwardly from about the bottom line of the applicator side arms 10a, 10b and that they have vertical thickness corresponding substantially to the axial thickness of one of said retaining rings. From FIGS. 2 and 4 in particular it will also be understood that said rings R are of the open type which subtend an arc not greatly exceeding 180° and that said rings are formed along their inner peripheries with middle and end protrusions which (at the locations thereof) give greater radial dimension than the ring body proper. FIGS. 2 and 4 also make it clear that the width of the stack rod (spring rail 14) is such that it engages behind the end lugs of the retaining rings threaded thereon. Accordingly, the stack rod is adapted to secure a plurality of rings to be disposed positioned with their open ends facing forwardly in a vertical stack disposed immediately above the cut-out opening 19 of the applicator blade. It will also be seen, particularly from FIG. 7, that as the stack rod terminates at its lower end just above the plane of the upper surface of the jaw members 17, 18 and is capable of flexing rearwardly, the lowermost rings of the stack are free to shift rearwardly with any rearward flexing of the stack rod, during the course of which they will move onto the upper surface of the jaw members 17, 18.

Figure 7A:
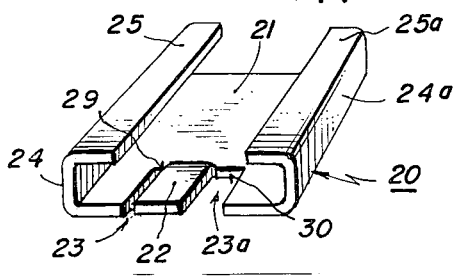
FIG. 7A is an enlarged perspective view looking into the rearward end of the retractible slide which illustrates in detail the preferred construction thereof.

According to an important feature of the present invention, the cut-out 19 which actually extends through the applicator blade member 10 is normally closed on its bottom by means of a retractible slide of channel section generally designated 20 and which is shown in detail in FIG. 7A. The slide consists of an imperforate flat bottom wall or plate 21 of internal width slightly greater than that of the working end of said applicator blade, which is provided along its rearward edge (shown to be the forward edge in FIG. 7A) with a tongue 22 which is preferably offset upwardly from the plane of the bottom wall and also is defined along its sides by parallel slots 23, 23a which extend longitudinally forward from the rearward edge of said plate. The side arms 24, 24a of the slide which extend upwardly from its bottom wall 20 have depth corresponding substantially to the vertical dimension of the applicator blade 10 and they terminate in inwardly directed flanges 25, 25a which extend over the top face of said applicator blade, and particularly the side arms 10a, 10b thereof.

Figure 6:
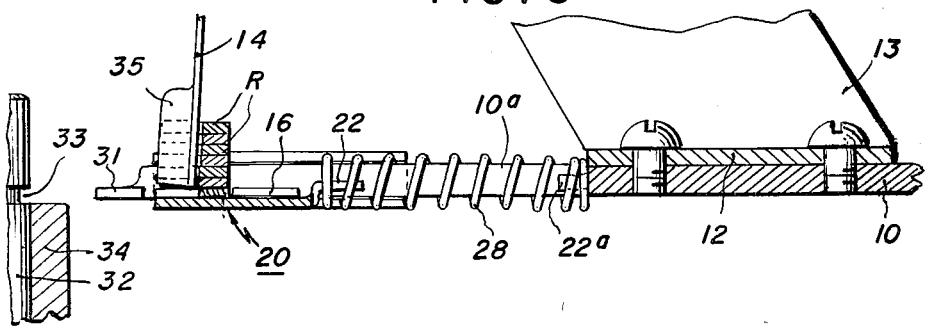

The aforesaid slide 20 is normally urged to a forward position in which it abuts against angled stops or shoulders 26, 27 that extend integrally from the ends of the applicator arms 10a, 10b, by spring means, illustratively a coil spring 28, accommodated in the aforesaid opening 15 of the applicator blade and which is reactive between the rearward edge of said opening and the rearward edge of the slide 20. As best seen in FIGS. 6 and 7, the spring 28 is retained in place by the slide tongue 22 extending into its axial opening, the spring preferably also seating in the slots 23, 23a provided in the slide bottom plate 21 so that it bears against the rearward ends 29, 30 of said slots. The applicator member 10 may be also formed with an oppositely arranged spring retaining tongue 22a extending into the rearward end of the spring, as indicated in FIG. 6. Thus, the spring 28 normally functions to urge the slide 20 forwardly against the shoulders 26, 27 serving as limiting stops therefor, while at the same time it permits the slide to partake of rearward or retracting movement upon the applicator being urged against a fixture, as indicated in FIG. 7.

As in my prior application Serial No. 485,785, one of the applicator arms, illustratively the arm 10b, is provided with a forwardly projecting guide or pilot finger 31 disposed at the same horizontal level as the cut-out 19 and whose inner edge is adapted to enter the groove in the shaft or pin to which the applicator is presented, slightly in advance of the applicator blade proper engaging said shaft or pin, thereby to accurately position the applicator with respect to the groove.

Figure 5:
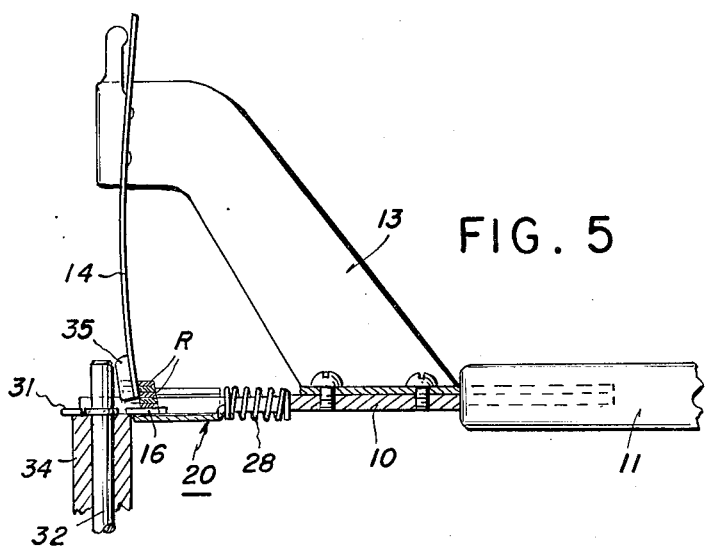

As forecast above, an applicator according to the invention is designed to dispense and thereupon transfer and seat a retaining ring in the groove of a shaft or pin which is disposed immediately above the upper end face of the fixture which supports said shaft or pin. To illustrate the manner in which an applicator according to the invention performs as aforesaid, reference is had particularly to FIGS. 6 and 7 wherein a shaft or pin 32 (hereinafter referred to as the "pin") provided with a ring groove 33 is supported in a fixture 34 and positioned axially with respect thereto so that the groove 33 is disposed immediately above the upper end face of the fixture as would preclude the use of an applicator having a rigid backing flange according to my aforesaid application Serial No. 485,785. The tool is of course presented to the pin 32 in the horizontal position such that the guide finger 31 is aligned horizontally with the groove 33, whereby as the tool is brought against the pin the guide finger enters the groove prior to the tool proper abutting the pin and/or fixture. With the tool now guided or piloted by the guide finger, it is pushed against tool and fixture. As seen in FIGS. 5 and 7, such causes the slide 20 to retract and the applicator blade 10 to advance relatively toward the pin. During such advance movement, the arcuate forward edges of the jaw members 16, 17 which define the cut-out containing the ring to be applied push against said ring and, in so doing, force it into the groove 33. Since the slide 20 is free to retract, it provides no obstruction to the aforesaid advance movement of applicator blade with respect to the pin 32, even though the bottom plate 21 of the slide is positioned at a level such that it may abut the upper end or corner of the fixture 34. It will also be understood from my prior application aforesaid that, consequent to the lower end of the stack rod 14 being capable of flexing rearwardly, the lowermost rings of the stack mounted thereon may move a limited distance rearwardly, so that they also offer no obstruction to the advance movement of the applicator blade with respect to the pin 32 as aforesaid. Accordingly, the applicator member may complete its advance movement required to transfer a ring contained in the cut-out 19 to the groove 33 without obstruction offered either by the rings immediately above the ring being transferred or by the slide which normally forms the bottom wall of the cut-out. Upon ring transfer having been completed, the applicator is backed off the pin, whereupon the slide 20 returns to normal position under the urge of spring 28 and also the stack rod 14 returns to its normal position, during which it moves the lowermost rings which have displaced rearwardly to their normal position directly overlying the cut-out 19. The lowermost ring then on the stack rod is now free to drop into said cut-out (whose bottom is now reclosed by the slide 20) which it proceeds to do, whereupon the tool is conditioned for the next ring dispensing and applying operation.

According to a further feature of the invention, the lower spring rail portion 14 of the stack rod is provided at its lower end with a forwardly extending rib 35 of width and height such that it is normally accommodated within the gap between the open ends of the lower retaining rings mounted on the stack rod. Similarly to the lower end of said stack rod, the lower end of the rib 35 terminates closed to the upper line of the cut-out 19 and of the jaw-members 16, 17. Thus, in addition to the rib 35 maintaining at least the lower rings of the stack thereof mounted on the stack rod against unwanted angular turning movement, it more importantly functions to maintain the ring contained in the cut-out exactly in the plane of the pin groove 33 during the course of its transfer thereto. This action of the rib is best seen in FIG. 7, in which it will be noted that the tool is in a position in which it is effecting transfer of a ring then contained in its cut-out 19 to the groove. Consequent either to the lower rings on the stack rod 14 abutting the upper end of the pin 32, or to the forward vertical edge of the rib engaging said pin, the lower end of the stack rod has flexed rearwardly as insures that the lower rings thereon offer no obstruction to the final advance or ring-feeding movement of the applicator blade 10. Responsive to the rearward movement of the stack rod 14 as aforesaid, the rib 35 also moves rearwardly. In so doing, its under end bears more or less closely on the middle portion of the ring being transferred, which portion includes the ring middle protrusion and hence has substantial radial dimension. Through its ability to bear on the ring as it is being transferred from the applicator cut-out 19 to the pin groove, the rib holds this ring against movement to an angular position in the course of its moving into or in seating in its groove, which it might take if it is not so held.

According to the modified ring dispensing and applicator tool shown in FIGS. 8–11, the tool proper is the same as described, the difference being in the substitution of a work-to-tool guide means for the previously described guide finger 31, which is especially effective when the grooved shaft or pin is to be moved by hand toward the tool, in which case special provision must be made to insure that tool and groove are exactly aligned in the horizontal plane. The different guide means as above, and which is generally indicated by the reference numeral 37, comprises a rectangular body member 38 of size enabling it to be assembled to the rigid portion of the applicator blade member 10 beneath the flange 12 of bracket 13 and secured by the same screws which secure the bracket, and integral resilient side arms 40, 41 which extend forwardly beyond and to the outer sides of the slide 20. At their forward terminals, said side arms are provided with inwardly directed fingers 42, 43 which, like the aforesaid guide finger 31, are disposed at the same level as the cut-out 19 in the applicator blade. Preferably also ears 44, 45 are formed on the side arms 40, 41 so as to extend inwardly therefrom at approximately the upper line of said arms. As seen in FIG. 9C the ears 44, 45 are displaced rearwardly a small distance from the aforesaid fingers 42, 43.

When a ring is to be assembled on a pin 32 held in his hand by the operator, as distinguished from being held by a fixture similar to fixture 34, the pin is moved against the tool while held at a level such that the side edges of the fingers 42, 43 may enter the pin groove 33 from the opposite sides thereof, such making for centering of pin with respect to tool as well as exact alignment of groove and tool cut-out 19. As before, the pin presses against the slide 20 which retracts and hence offers no obstruction to the pin being pushed relatively rearwardly and finally into the ring contained in said cut-out 19. Assuming the groove 33 to be spaced axially a fixed distance from the end of the shaft or pin corresponding to the vertical distance between the aforesaid guide fingers 42, 43 and the ears 44, 45, the latter bear on the upper face of the applicator blade thereby to prevent any relative vertical motion taking place as between applicator blade and guide finger. Consequent to the resiliency of the guide arms 40, 41, the latter may spread the amount necessary to enable the tool to be backed off from the pin, i.e. the amount enabling the fingers 42, 43 clearing the now assembled ring as the tool is moved away from the pin, as indicated in FIG. 10.

FIG. 12 illustrates the possibility of mounting a tool as aforesaid on a fixed support such as a base adapted to be attached to a work bench, for example. More particularly, reference numeral 50 designates a fixed base member mounting an upright carriage 51 slidable in longitudinal direction in a slideway 52. An applicator-blade member 10S, corresponding in all respects to the applicator blade member of the FIGS. 1-11 forms, except that it is not carried by a handle, is affixed to the upper face of the carriage 51, as shown, and together with its bracket-attached stack rod 14 and aforesaid slide 20 is movable bodily with the carriage. Such movement is toward and away from a fixture F-1 (corresponding to the previously described fixture 34) mounting the grooved shaft or pin 32 on which a ring is to be assembled. It will be understood that movement of the carriage toward the fixture effects assembly of the ring then in the "assembly-ready" position in the applicator-blade cut-out and that retraction of the carriage results in lowering of the next higher ring of the column thereof mounted on the stack rod to the cut-out, all as described in the foregoing in connection with the FIGS. 1-11 forms. Mention is also here made of the possibility of mounting a battery of ring-applying dispensing tools as aforesaid on a common slide carriage, thereby to effect assembly of a plurality of rings in a single operation.

Referring now to FIGS. 13-17 illustrating a further form of support-mounted, as distinguished from hand-carried, tool of the invention and which is further characterized by positive, as distinguished from gravity, feed of rings from stack rod to applicator-member cut-out, reference numeral 60 designates a vertical bracket member, hereinafter for convenience called a bracket, which is spaced from and is mounted for reciprocation on a vertical plate or standard member 61 relative to a fixture 62 (corresponding to the aforesaid fixture 34) which secures a grooved shaft or pin 63 in whose groove 64 one of the plurality of open retaining rings R is to be assembled. To provide for such bracket movement, the bracket mounts on its rear side a horizontal block or bar 65 having a T-shaped slideway 66 cut or otherwise formed therein so as to open through its rear face, which slideway slidably receives a horizontally disposed T-shaped rail or track 67 rigidly affixed to and extending forwardly from the front face of the standard 61. The aforesaid fixture 62 is shown to be removably but stationarily seated in a part-circular opening 68 cut or otherwise formed in the top face of an overhanging table 69 or shelf which extends laterally from one end of the standard in the direction of the bracket 60. As seen in FIG. 13, the opening 68 communicates with a generally U-shaped or notch-like recess 68a cut or otherwise formed in the under face of said table 69 so as to open through the edge of the table adjacent said bracket 60. By the aforesaid arrangement the fixture 62, although removable from the recess 68, functions to secure the shaft or pin 63 so that its lower end which has the groove 64 formed therein projects into the under face recess 68a, whereby the groove is fully accessible from beneath the table 69, and said fixture 62 is moreover effective to position the groove at a fixed elevation.

Extending along the side edge of the bracket 60 which is adjacent the fixture and shaft receiving recesses 68, 68a is a spring rail 70 functioning as a stack rod corresponding to the previously referred to stack rod 14. Preferably, the rail is secured to the edge of a U-bent extension 60a formed along the aforesaid side edge of the bracket 60. Thus, the rail is spaced slightly forwardly from the front face of the bracket and it is also disposed at a right angle to said face. It is also to be observed that the U-bent extension 60a terminates a substantial distance below the top edge of the bracket, whereas the rail or stack rod 70 extends substantially to the bracket top edge.

As best seen in FIG. 14, the upper portion of the bracket 60 is bent forwardly at a right angle so as to form a horizontal overhang 71 to which is connected, as by screws 72, 72a, a so-called applicator blade 73 whose construction illustratively is that of the aforesaid applicator blade 10 of the FIGS. 1-12 forms. That is to say, it consists of two springy side arms 74, 74a which are laterally spaced from one another by a longitudinal slot 75 and which terminate in plane jaw members 76, 76a (FIG. 15) whose forward edges are curved so that they together define a substantially circular cut-out 77 conforming to the outer edge contour of the rings R and adapted to receive one of the rings feeding thereinto. It will be observed, however, that although the stack rod is arranged in vertical alignment with said cut-out 77, it is positioned on the under side of applicator-blade member and hence below the cut-out.

The aforesaid cut-out 77 is normally closed from above, i.e. on its upper side or face, by a retractible slide 78 mounted for sliding movement on the working or cut-out end of the applicator blade, said slide corresponding in all substantial respects with the previously described slide 20, except that its position is reversed so that its channel opens downwardly. Said slide is normally urged into its forward or cut-out closing position by spring means such as a coil 82 corresponding to the spring 28 of the earlier described forms. Forward movement of the slide beyond its normal position illustrated in FIG. 15 is prevented by angled stops 83, 84 corresponding to the aforesaid stops 26, 27.

With the stack rod disposed below the applicator blade 73, the retaining rings R must of necessity be positively fed in upward direction to the applicator cut-out 77 following completion of each ring-assembling operation. According to the invention, such positive ring feeding means illustratively comprises a coil spring 85 fastened at one end to a fixed point on the lower part of the bracket 60 and having its intermediate portion trained over a sheave or roll turning on an axis located near the upper end of said bracket, and its other end affixed to a slide block 87 mounted to slide on rail or stack rod 70. By the above described spring mounting, which provides a substantial length of spring, its stroke is purposely made large. Thus it is effective to feed the rings of a large supply thereof arranged as a deep stack or column on the stack rod 70.

The operation of the FIGS. 13–17 form of tool is substantially similar to that of the tool as herein previously described, except that the rings are positively fed one-by-one in upward direction to the cut-out 77 from below the latter, rather than simply lowering by gravity to the cut-out from a ring stack extending vertically above the cut-out. Such operation will perhaps be better understood from a consideration of FIGS. 16 and 17 however, which illustrate that the shaft or pin holding fixture 62 is preferably provided on its under end face with a small-depth boss-like formation 62a whose central end-face portion may be disposed exactly in the plane of the uppermost side wall of the shaft groove 64 and whose peripheral end-face portion defines a shoulder directly in the path of movement of the forward edge of retractible slide 78.

To initiate the assembly of the topmost ring R of the ring stack mounted in the stack rod 70 in groove 64, the bracket 60 is of course moved toward the shaft or pin 63. During the first part of this movement, the forward transverse edge of the slide 78 will hit the peripheral edge of the fixture embossment 62a, whereupon the slide begins to retract against the action of spring 85. Despite this movement of the slide, said topmost ring R is prevented from moving upwardly from the cut-out 77 under the force of spring 85 by the radial end face of the fixture, i.e. of its embossment 62a, under which at least the ring ends have by this time moved. Continued movement of the bracket 60 and hence of the applicator blade 73 results in the said topmost ring R being forced into the groove 64 by the forward edges of the jaws 76, 76a which define the ring cut-out. Since the stack rod 70 is springy and its upper end is free to flex rearwardly upon the rings immediately below the topmost ring R engaging the downwardly projecting shaft or pin end, final bottoming movement of said ring R is effected without obstruction from said lower rings, which latter instead move beneath the jaw members 76, 76a which temporarily serve to hold or back the rings from above against the upwardly acting force of the feed spring 85.

Upon full assembly of said topmost ring having been completed, the tool is backed off from the shaft or pin 63, such resulting in the retracted slide 78 returning to its normal forward position in which it closes the upper side of the cut-out 77, and further resulting in the stack rod 70 returning to its normal or unflexed position, consequent to which the next topmost ring R is automatically projected into "assembly-ready" position in the cut-out 77 under the force of the spring 85 acting thereon through the stack or rings on the stack rod. When such transpires, the tool is conditioned for the next ring-assembly operation, which may be performed upon another shaft or pin 63 together with its holding fixture 62 being mounted in the support.

According to the FIG. 18 embodiment, the bracket 60a which mounts the applicator blade, and hence said blade, together with the stack rod 70 and the spring means 85, 86, 87 for positively feeding the rings R one-by-one from the stack to the applicator cut-out 77, are fixed to the standard 61, whereas the fixture-supporting means 69a (corresponding to the table 69 of the prior embodiment) is mounted for reciprocatory movement toward and away from the fixed applicator blade. According to this modified form, the table 69a comprises a component part of a slide bracket 90 mounted to slide on a rail or track 91 corresponding to the aforesaid rail or track 67. The operation of the modified tool is the same as that of the tool shown in FIGS. 13–17, except that the fixture 62 and shaft or pin 63 carried thereby are together movable and the bracket and applicator blade 73 are fixed, rather than the bracket and applicator blade being movable and the fixture and shaft stationary, as with the FIGS. 13–17 modification.

Instead of the coil spring 85 providing the spring ring-feeding force according to the FIGS. 13–17 and FIG. 18 modifications, a spring means generally indicated at 95 (FIG. 19) may be employed with good effect. In such modified spring means, the spring proper is in the form of a spiral spring 96 connected between a fixed axle 97 carried by the bracket 70 and a point on a reel 98. A flexible tape 99 of substantial length is wound on the peripheral surface of the reel so that it can be extended to considerable length against the action of the spring 96, which latter tends to rewind the tape on the reel. The free end of the tape 99 is adapted to be secured to a slide block corresponding to the slide block 37 of the prior described modifications.

While retaining ring dispensing and applying tools characterized by vertical feed of the rings in upward direction as aforesaid yield the advantage of reduced vertical height of the tool, as compared to a tool whose stack rod extends vertically above the applicator member, there are yet other applications in which the overall vertical dimension of the tool must be further limited and/or the rings must be assembled on horizontally disposed shafts or pins from below the same rather than from the side. To satisfy the latter requirements, a retaining ring dispensing and applying tool as shown in FIG. 20 has been provided. As in the FIG. 18 form of tool above, the modified tool includes a fixed bracket 100, but it will be noted that the major dimension of said bracket extends horizontally rather than vertically, and thus its vertical dimension is substantially reduced as compared to the vertical dimension of the bracket of the FIG. 18 tool. Such may be simply effected as by mounting the bracket 100 from a horizontal base member 101 turned so that its top, substantially horizontal edge provides the stack rod carrying edge, whereby the stack rod 102 is horizontally disposed, and so that its vertical side edge provides the applicator blade-carrying edge whereby the applicator blade 103 is vertically disposed. Such positions the ring-receiving cut-out 104 vertically and in alignment with the substantially horizontal stack of rings R carried by the stack rod 102. Preferably, the spring means for positively feeding the rings one-by-one from the stack or supply thereof on the stack rod 102 to the cut-out 104 of the applicator member is of the type illustrated in FIG. 19, wherein a tape 105 wound on a reel 106 is placed under tension as it is unwound by a spiral spring (not shown) corresponding to the spiral spring 96 of the FIG. 19 spring means. The free end of the tape 105 is shown to be connected to a slide block 107 mounted to slide on the stack rod 102. Thus, the spiral spring functions to positively feed the rings R in a substantially horizontal path, as required to advance the rings one-by-one to the "assembly-ready" position in the vertically disposed applicator cut-out 104.

Since in the illustrated tool the bracket 100 is held stationary and the applicator cut-out 104 opens in upward direction, the shaft or pin 108 in whose groove 109 a ring is to be assembled is of necessity positioned above the applicator blade 103, with the groove 109 in the same vertical plane as that containing the applicator cut-out. Accordingly, ring assembly is effected by moving a fixture 110 which holds the shaft or pin with its groove 109 disposed as aforesaid downwardly toward and thence upwardly away from the applicator. Of course, it will be understood that without material modification the reverse arrangement may obtain, according to which the fixture 110 is held stationary and the bracket 100 together with the applicator blade and spring-feed means is reciprocated vertically toward and away from said fixture.

Without further analysis, it will be appreciated that the various forms of retaining ring dispensing and applying tools described above satisfy in an effective manner the objectives of the invention as outlined in the foregoing. However, as many changes could be made in carrying out the above constructions without departing from the scope of the invention, it is intended that all matter contained in the above description or shown in the accompanying drawings shall be interpreted as illustrative and not in a limiting sense.

I claim:

1. A device for dispensing open retaining rings and for applying them to grooved shafts, pins and the like comprising, in combination, a blade-like applicator member having a working end provided with a forwardly opening, substantially semi-circular cut-out of size to accommodate a ring feeding thereinto and also to enable said working end to straddle the shaft on which said ring is to be assembled and whose defining edge has thickness corresponding substantially to the axial thickness of a single retaining ring and serves solely as a push shoulder for a ring received in said cut-out, a stack rod disposed substantially normal to said applicator member and in alignment with said cut-out for mounting a plurality of retaining rings positioned with their open ends facing forwardly in a column extending toward and feeding to said cut-out, at least the end of the stack rod adjacent said cut-out being flexible, means fixedly interconnecting the other ends of the applicator member and stack rod and operatively supporting the stack rod in such manner and at such a level that its said flexible end may flex rearwardly relative to the applicator member and to the lowermost ring of the column then contained in said cut-out, a slide member including means adapted to form a closure for said cut-out and being mounted for sliding movement on the working end of said applicator member from and to a normal position in which it forms a closure for the cut-out and thereby an end support for the ring column, and means reactive between said applicator and slide members for urging said slide member to its normal position aforesaid but permitting it to slide rearwardly along said applicator member upon said device being bodily moved against a fixed element.

2. A device for dispensing open retaining rings and for applying them to grooved shafts, pins and the like as set forth in claim 1, wherein said slide member has channel section and includes an imperforate plate portion extending transversely across the working end of the applicator member and forming said closure means.

3. A device for dispensing open retaining rings and for applying them to grooved shafts, pins and the like as set forth in claim 1, wherein at least the working end of the applicator blade includes side arms on which the slide member slides, said side arms terminating at their forward ends in angled stops against which said slide member is normally urged as aforesaid.

4. A device for dispensing open retaining rings and for appplying them to grooved shafts, pins and the like as set forth in claim 1, wherein the working end of the applicator member mounts ring-to-groove guide means including a pair of spreadable fingers extending forwardly from the working end of said applicator member and disposed in the plane of the ring cut-out, said fingers being adapted to move into the shaft or pin groove immediately prior to transfer of the ring contained in the cut-out to said groove, thereby to accurately position said ring with respect to the groove, and being free to spread as said device is retracted from said ring following its transfer to said groove.

5. A device for dispensing open retaining rings and for applying them to grooved shafts, pins and the like as set forth in claim 1, wherein the working end of the applicator blade includes side arms on which the slide member slides, said side arms terminating in forwardly extending, spreadable, inwardly directed fingers having inner edges which are spaced from one another approximately the diameter of the groove bottom and are disposed in the same plane as the ring cut-out, said fingers being adapted to be inserted in the groove from diametrically opposite sides thereof immediately prior to the transfer of a ring from the cut-out to said groove thereby to accurately position the device with respect to said groove for said transfer.

6. A device for dispensing open retaining rings and for applying them to grooved shafts, pins and the like as set forth in claim 1, wherein said stack rod is generally vertically disposed and is arranged above the cut-out whereby the rings of the column thereof mounted on the stack rod feed by gravity to the cut-out.

7. A device for dispensing open retaining rings and for applying them to grooved shafts, pins and the like as set forth in claim 1, wherein said stack rod is non-vertically disposed and means are provided for positively urging the ring column towards the slide member acting as an end support therefor, whereby the rings of the column feed positively to the cut-out.

8. A device for dispensing open retaining rings and for applying them to grooved shafts, pins and the like as set forth in claim 1, wherein said stack rod is non-vertically disposed, and wherein said device incorporates spring-energized means mounted on and slidable along the stack rod for positively urging the ring column towards the slide member acting as an end support therefor.

9. A device for dispensing open retaining rings and for applying them to grooved shafts, pins and the like as set forth in claim 1, wherein said applicator and slide members are horizontally disposed and said slide member is positioned to close the cut-out from above, and said stack rod is vertically disposed and arranged below the cut-out; and wherein said device incorporates spring-energized means slidable along the stack rod for positively urging the ring column upwardly against the slide member acting as an end support therefor and thereby for effecting positive feed of the rings to the cut-out.

10. A device for dispensing open retaining rings and for applying them to grooved shafts, pins and the like as set forth in claim 1, wherein said applicator and slide members are vertically disposed whereby said slide member closes off one vertical face of the cut-out and said stack rod is horizontally disposed and extends towards the other side face of the cut-out; and wherein said device incorporates spring-energized means slideable along the stack rod for urging the ring column towards the slide member acting as an end support therefor whereby to effect positive feed of the rings to the cut-out.

11. A device for dispensing open retaining rings and for applying them to grooved shafts, pins and the like as set forth in claim 5, wherein said side arms also carry spaced, inwardly directed ears disposed relatively rearwardly of and at a different level than said fingers, the rearward disposition and the difference in level of the ears with respect to the fingers being such that said ears engage on the upper surface of the applicator blade adjacent said fingers thereby to prevent relative vertical motion between applicator blade and said fingers.

References Cited in the file of this patent

UNITED STATES PATENTS

| | | |
|---|---|---|
| 1,073,280 | Owen | Sept. 16, 1913 |
| 1,110,691 | Hurt | Sept. 15, 1914 |
| 2,172,847 | Nydegger | Sept. 12, 1939 |
| 2,480,037 | Luckins | Aug. 23, 1949 |
| 2,483,379 | Brell | Sept. 27, 1949 |
| 2,555,903 | Schroeder | June 5, 1951 |